United States Patent [19]

Motomura et al.

[11] 4,386,539

[45] Jun. 7, 1983

[54] FIXING AND HEATING DEVICE FOR ELECTROSTATIC COPYING APPARATUS

[75] Inventors: Minoru Motomura, Nara; Kiyoshi Shibata, Osaka; Toshio Watanabe, Takatsuki, all of Japan

[73] Assignee: Mita Industrial Company Limited, Osaka, Japan

[21] Appl. No.: 254,279

[22] Filed: Apr. 15, 1981

Related U.S. Application Data

[62] Division of Ser. No. 158,381, Jun. 11, 1980, Pat. No. 4,316,719.

[30] Foreign Application Priority Data

Jun. 15, 1979 [JP] Japan .......... 54-75886
Jun. 15, 1979 [JP] Japan .......... 54-75887

[51] Int. Cl.$^3$ .......... F16H 37/06

[52] U.S. Cl. .......... 74/661; 74/665 B; 432/60; 474/74; 474/84

[58] Field of Search .......... 271/270, 272, 273, 274, 271/314; 74/661, 665 A, 665 B, 665 C, 665 D, 665 E, 665 L, 665 N, 847; 474/73, 74, 84; 432/60

[56] References Cited

U.S. PATENT DOCUMENTS

| | | | |
|---|---|---|---|
| 2,356,590 | 8/1944 | Jacobsen | 74/661 |
| 2,826,096 | 3/1958 | Hoge | 74/661 |
| 2,949,817 | 8/1960 | Feindler | 74/665 D X |
| 3,127,790 | 4/1964 | Howey | 74/661 |
| 3,324,791 | 6/1967 | Cassano et al. | 271/314 X |
| 3,367,440 | 2/1968 | Becker | 74/847 X |
| 3,915,271 | 10/1975 | Harper | 74/847 X |
| 4,212,631 | 7/1980 | Franke et al. | 432/60 |

FOREIGN PATENT DOCUMENTS

| | | | |
|---|---|---|---|
| 53-30335 | 8/1978 | Japan | 432/60 |

OTHER PUBLICATIONS

IBM Technical Disclosure Bulletin, "Speed-Match-/Lost Grating Deflection Apparatus", 2-9-81, vol. 23, No. 9.

*Primary Examiner*—Leslie A. Braun
*Assistant Examiner*—Lawrence J. Gotts
*Attorney, Agent, or Firm*—Wenderoth, Lind & Ponack

[57] ABSTRACT

A fixing and heating device for an electrostatic copying apparatus includes a fixing roller which (a) remains stationary at least until a toner is softened, (b) is driven at a low speed to even the surface temperature of the fixing roller when the surface temperature is lower than a temperature suitable for fixing, and is equal to the temperature suitable for fixing except during a fixing operation, and (c) is driven at a speed suitable for fixing when the surface temperature is suitable for fixing during the fixing operation.

3 Claims, 5 Drawing Figures

FIXING AND HEATING DEVICE FOR ELECTROSTATIC COPYING APPARATUS

This is a division of Ser. No. 158,381, filed June 11, 1980, now U.S. Pat. No. 4,316,719.

BACKGROUND OF THE INVENTION

1. Field of the Invention

The present invention relates to a fixing and heating device to be used for an electrostatic copying apparatus for heating and fixing a toner image on a copy paper sheet passed through a pair of fixing rollers, and more particularly to temperature control of the fixing rollers.

2. Description of the Prior Art

In one prior art arrangement, fixing rollers are driven to rotate at a relatively high speed suitable for fixing when a power switch is closed. Before the power switch is closed, toner remains residually from a preceding copying operation and solidifies on the fixing rollers, and thereby a pair of the fixing rollers contact with each other. The fixing rollers rotate upon closing the power switch. At this time one fixing roller is not heated at a softening temperature or a melting temperature of the toner, and therefore the solidified toner remaining on the fixing rollers injures the fixing rollers.

Another prior art arrangement comprises a scraper plate for scraping off the toner remaining on the fixing roller to prevent a copy paper from winding around the fixing roller. Since the fixing roller is driven to rotate before the solidified toner remaining between the surface of the fixing roller and the scraper plate is softened and melted, the scraper plate is deformed by rotation of the fixing roller. The toner solidifying on the fixing roller and the scraper plate result in a sound occurring when when the fixing roller begins to rotate. Resultant rotation at a relatively high speed causes the fixing rollers to make a larger noise.

Still another prior art arrangement comprises a fixing roller which begins to rotate at a relatively high speed when the power switch is closed, and the surface of the fixing rollers is heated at a temperature suitable for fixing. Once the fixing rollers are heated at the temperature suitable for fixing, they continuously rotate at a relatively high speed. Therefore, continuous rotation causes damage to the fixing rollers and causes the fixing rollers to make sounds. Further, when a fixing operation is performed as soon as the fixing rollers reach the temperature suitable for fixing and begin to rotate, since the surface temperature of the fixing rollers not yet been made uniform, a disadvantageous fixing state is provided over a copy paper sheet by an insufficient heated temperature or by a poor quality of fixing. Moreover, since the fixing rollers remain stationary until the fixing rollers reach the temperature suitable for fixing, a pair of the fixing rollers tend to be deformed by mutual pressure against each other.

It is an object of the invention to provide a fixing and heating device to prevent the fixing rollers from being injured by residual toner on the fixing rollers.

A more particular object of the invention is to provide a new and improved fixing and heating device for fixing toner images on a copy paper sheet.

These and other objects will become more apparent from the following description and drawings.

SUMMARY OF THE INVENTION

To accomplish the foregoing objectives, there is provided a fixing and heating device for an electrostatic copying apparatus wherein a copy paper sheet having a toner image is guided between fixing rollers whose surfaces are heated to a temperature suitable for fixing. There is provided a temperature detecting element for detecting a surface temperature of the fixing roller, and in response to the output from the temperature detecting element: (a) when the fixing roller is heated within a range which is higher than the temperature at which the toner at least begins to be softened and is lower than the temperature suitable for fixing, and is lower than a predetermined temperature preventing temperature unevenness until the fixing roller is heated at the temperature suitable for fixing, the fixing roller remains stationary; (b) when the fixing roller is heated within a range which lies between the predetermined temperature and the temperature suitable for fixing, the fixing roller is rotated at a lower speed than a proper speed suitable for fixing; (c) when the fixing roller is heated to the temperature suitable for fixing, the fixing roller is driven to rotate in a proper speed for a fixing operation and is driven to rotate at a lower speed except during a fixing operation.

In accordance with the invention, since the fixing rollers still remain stationary at least until the toner is softened, an adhesive force of any solidified toner remaining on the fixing rollers never adds an excessive force to each fixing roller, and the scraper plate for scraping off a copy paper sheet from the fixing roller is never injured. This results in that the fixing rollers are never injured and are prevented from making sounds.

When the surface of the fixing roller is heated within a range which is higher than the predetermined temperature and is lower than the temperature suitable for fixing, and when the surface of the fixing roller is heated at the temperature suitable for fixing except during a fixing operation, the fixing rollers are driven to rotate at a low speed which is lower than the speed suitable for fixing. Accordingly, the surface of the fixing roller is heated evenly and thus the temperature unevenness over the surface of the fixing roller is prevented. Further, the fixing roller is prevented from deforming. Sounds occurring by rotation at a relatively high speed suitable for fixing are reduced.

According to a preferred embodiment, the fixing and heating device comprises:

main driving means for driving the fixing roller at a proper speed suitable for fixing;

a one-way clutch provided between the main driving means and the fixing roller for transmitting a rotational driving force from the main driving means to the fixing roller;

low speed driving means for driving the fixing roller at a lower speed than a proper speed suitable for fixing;

a magnetic clutch provided between the low speed driving means and the fixing roller;

control means operable in response to the output from a temperature detecting element, (a) for unabling the main driving means and making the magnetic clutch open when the surface of the fixing roller is heated to a temperature lower than a predetermined temperature, (b) rendering inoperative the main driving means, rendering operative the low speed driving means and making the magnetic clutch closed when the surface of the fixing roller is heated within a range which is higher than the predetermined temperature and is lower than a temperature suitable for fixing and (c) for rendering operative the main driving means and making the magnetic clutch during a fixing operation, and for rendering inoperative the main driving means, rendering operative the low speed driving means and making the magnetic clutch closed except during a fixing operation.

The low speed driving means comprises a motor, and a reducing gear train between the motor and the magnetic clutch or between the magnetic clutch and the fixing roller.

The control means closes the magnetic clutch when an inertia force for the main driving means damps after the main driving means is rendered inoperative.

According to another preferred embodiment, there is provided main driving means for driving the fixing roller at a proper speed for fixing:

a first one-way clutch between the main driving means and the fixing roller for transmitting a rotational driving force from the main driving means to the fixing roller;

low speed driving means for driving the fixing roller at a lower speed than a proper speed for fixing;

a second one-way clutch between the low speed driving means and the fixing roller for transmitting a rotational driving force from the low speed driving means to the fixing roller;

control means operable in response to the output from a temperature detecting element (a) for rendering inoperative the main driving means and the low speed driving means when the fixing roller is heated to a temperature lower than a predetermined temperature, (b) for rendering inoperative the main driving means and rendering operative the low speed driving means when the fixing roller is heated within a range which is higher than the predetermined temperature and is lower than a temperature suitable for fixing, (c) for rendering operative the main driving means during a fixing operative, and rendering inoperative the main driving means and rendering operative the low speed driving means except during a fixing operation, when the fixing roller is heated to the temperature suitable for fixing.

Another aspect of the invention provides an improved valiable speed device for a copying apparatus, wherein a follower member is driven at a low speed by the driving force from a motor through a reducing gear train and a magnetic clutch, and at a high speed by the driving force from high speed driving means through an one-way clutch. The magnetic clutch is closed when an inertia force of the high speed driving means damps after the high speed driving means is changed to be inoperative. Therefore, large inertia force of the high speed driving means is never broken suddenly by the reducing gear train or the motor, as a result of which an excessive load is not transmitted to a driving force transmitting means, and thus the reducing gear train is prevented from being damaged and the chain is prevented from being cut off.

BRIEF DESCRIPTION OF THE DRAWINGS

A detailed description of the invention now will be made with reference to the accompanying drawings wherein like numerals designate corresponding parts in the figures.

FIG. 4 is an electric circuit diagram for operation of the device of the invention.

FIG. 5 is a schematic longitudinal sectional view similar to FIG. 3, but of another embodiment of the invention.

DETAILED DESCRIPTION OF THE PREFERRED EMBODIMENT

The following detailed description is of the best presently contemplated mode of carrying out the invention. This description is not to be taken in a limiting sense, but is made merely for the purpose of illustrating the general principles of the invention since the scope of the invention is best defined by the appended claims.

Figure 1:
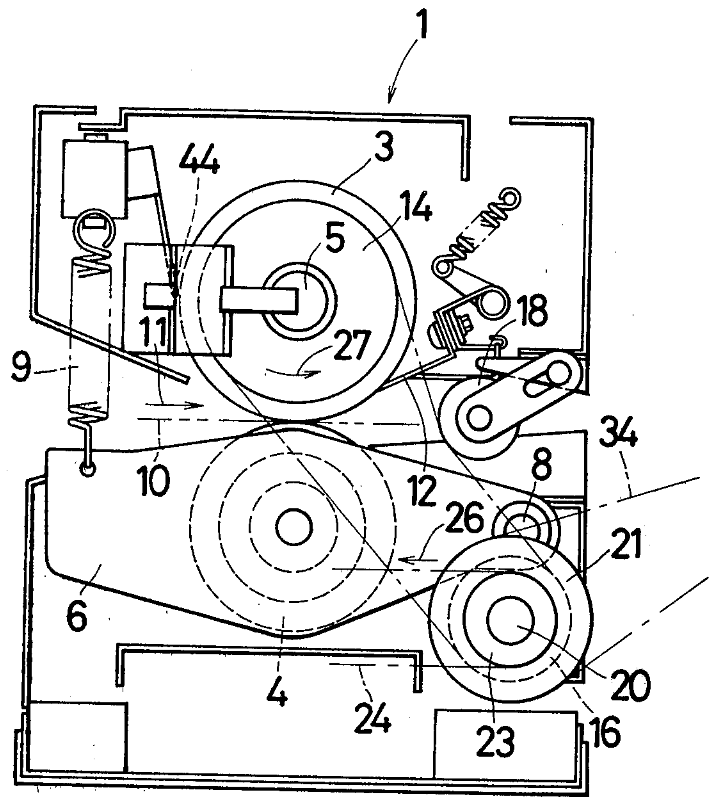
FIG. 1 is a simplified side view of a fixing and heating device for an electrostatic copying apparatus illustrating one embodiment of the invention.
Figure 2:
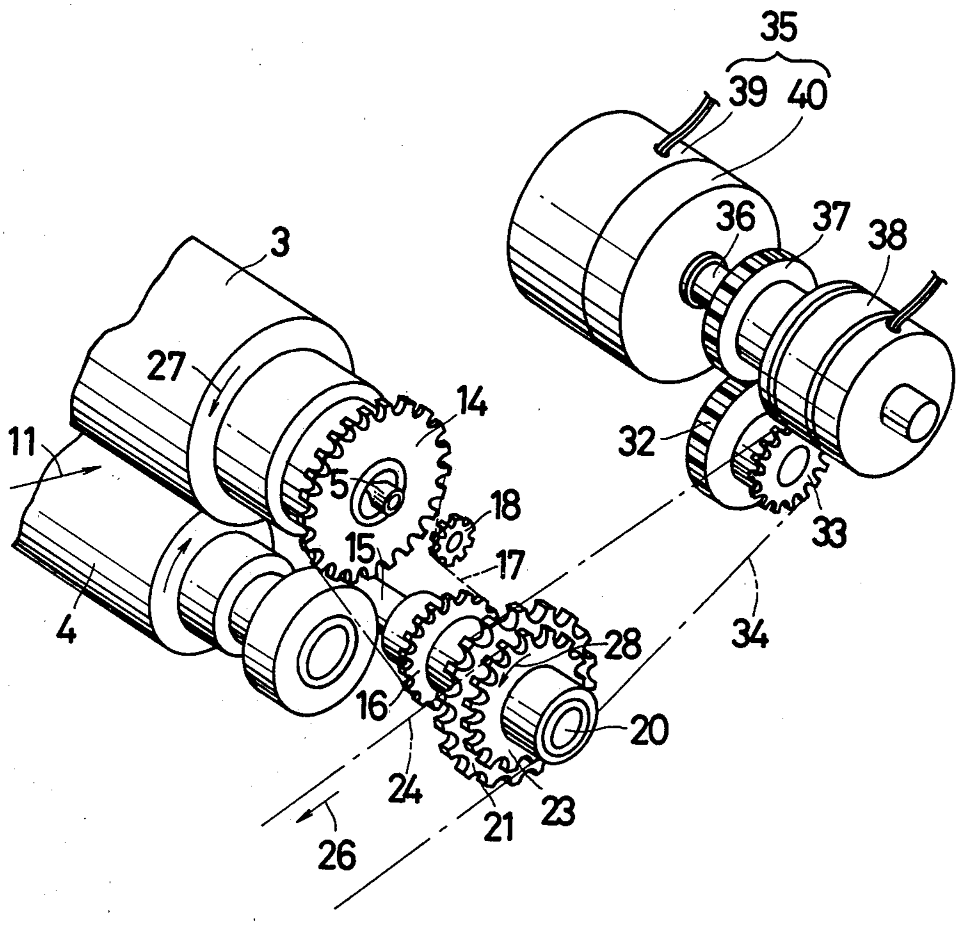
FIG. 2 is the partial perspective view of a fixing and heating device shown in FIG. 1.

FIG. 1 is a simplified side view of a fixing and heating device 1 for an electrostatic copying apparatus illustrating one embodiment of this invention, and FIG. 2 is a partial perspective view of the fixing and heating device 1 for the electrostatic copying apparatus. The fixing and heating device 1 is capable of being drawn out of the body of the electrostatic copying apparatus, in a direction into the plane of FIG. 1.

Figure 3:
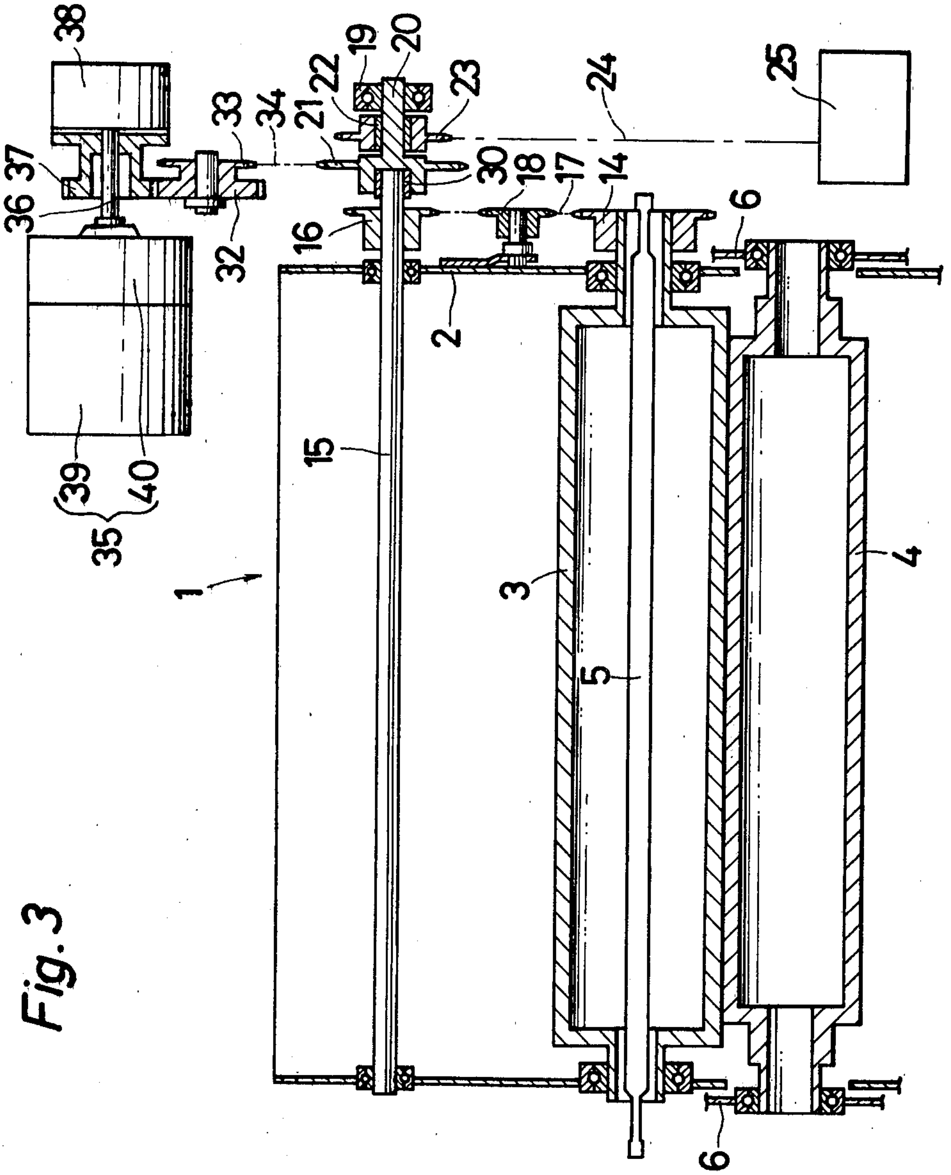
FIG. 3 is a schematic longitudinal sectional view taken along axes of fixing rollers, shown in FIG. 1.

FIG. 3 is a schematic longitudinal sectional view taken along a plane through the axes of fixing rollers 3 and 4. A frame 2 of the fixing and heating device 1 is provided with a pair of fixing rollers 3 and 4 which are parallel and which have horizontal axes. The fixing roller 3 is supported on the frame 2 of the fixing and heating device 1 to be rotated independently. A heater 5 is held in the fixing roller 3. The other fixing roller 4 is supported by a lever 6. One end of the lever 6 is supported on the frame 2 by a pin 8, and the other end of the lever 6 is spring-biased by a spring 9 so as to cause the fixing roller 4 to contact with the fixing roller 3.

The transport path of a copy paper sheet is depicted by reference number 10 shown in FIG. 1. The copy sheet paper is transported in the direction of arrow 11 by the pair of fixing rollers 3 and 4. A toner image corresponding to the original document is formed on the copy paper sheet transported between the fixing rollers 3 and 4. A scraper plate 12 is fitted downstream of the fixing roller 3 so as to scrape off the toner remaining on the surface of the fixing roller 3 and to peel off the copy paper sheet tending to wind with the fixing roller 3. An end of the fixing roller 3 has coaxially fixed thereto a sprocket wheel 14. A rotary shaft 15 fixed with a sprocket wheel 16 is supported on the frame 2 parallel to the fixing rollers 3 and 4. A chain 17 passes over the sprocket wheels 14 and 16, and then over a tensioning sprocket wheel 18.

A rotary shaft 20 is rotatably supported on the apparatus housing by a bearing 19. Sprocket wheel 21 is coupled with the rotary shaft 20 on which a sprocket wheel 23 is coaxially mounted through an one-way clutch 22. Sprocket wheel 23 is passed over by a chain 24 which is driven by a main driving means 25 including a motor. The one-way clutch 22 transmits a rotational driving force in the direction of an arrow 26 (FIG. 2) from the chain 24 to the rotary shaft 20. The driving direction 26 of the chain 24 corresponds to the rotative direction 27 of the fixing roller 3, and accordingly the copy paper sheet is transported in the direction shown by the arrow 11.

A one-way clutch 30 provided between the rotary shaft 15 and 20 transmits the rotational driving force from the rotary shaft 20 to the rotary shaft 15. When the fixing and heating device 1 is drawn out of the apparatus housing, the rotary shaft 15 is released from the one-way clutch 30, and when the device is subsequently inserted into the apparatus housing shaft 15 is again coupled to the one-way clutch 30. A sprocket wheel 33 is supported on the apparatus housing.

A chain 34 passes over the sprocket wheel 33 and then over the sprocket wheel 21. A gear 32 coaxially coupled to the sprocket wheel 33 meshes with a gear 37 idly mounted on an output shaft 36 of a low speed driving means 35. A magnetic clutch 38 is provided between the gear 37 and the low speed driving means 35. The low speed driving means 35 comprises a motor 39 and a reducing gear train 40 connected to the motor 39.

FIG. 4 is an electric circuit diagram of an embodiment of the invention. The heater 5 combined with the fixing roller 3 is connected to power source 42 and a temperature control circuit 43. A temperature detecting element 44 such as a thermister is attached to the surface of the fixing roller 3 so as to sense its temperature. The temperature control circuit 43 controls the energizing power of the heater 5 so as to keep the temperature suitable for fixing (for example 180° C.) in response to the output from the temperature detecting element 44. When a surface temperature of the fixing roller 3 which is sensed by the temperature detecting element 44 is lower than a predetermined temperature (for example 100° C.), one output line l1 of the temperature control circuit 43 is low level, and on the other hand it is high level at a temperature of 100° C. or more. Another output line l2 of the temperature control circuit 43 is low level when the surface temperature of the fixing roller 3 detected by the temperature detecting element 44 is lower than 180° C., and is high level when the detected surface temperature is higher than 180° C.

The temperature, for example 100° C. as above-mentioned, is chosen to be the same as or higher than the temperature at which a toner in solid form at least at room temperature begins to liquefy upon heated, to be lower than the temperature suitable for fixing (for example 180° C. as above-mentioned), and within a range such that low speed rotation as after-mentioned causes the surface temperature of the fixing rollers 3 and 4 to be uniform as the surface of the fixing roller 3 reaches the temperature suitable for fixing. Since the fixing rollers 3 and 4 are driven to rotate at a low speed until the surface of the fixing roller 3 reaches the temperature suitable for fixing (for example 180° C. as above-mentioned), which is higher than the predetermined temperature, after the surface of the fixing roller 3 has reached the predetermined temperature, the surface temperature of the fixing rollers 3 and 4 is uniformly dispersed in the circumferential direction to reduce temperature unevenness. Accordingly, the fixing operation is performed as soon as the surface of the fixing roller 3 has reached the temperature suitable for fixing, and an advantageous fixing state is provided over a copy paper sheet.

TABLE 1

| temperature of fixing roller 3 | room temperature ~ 100° C. | 100 ~ 180° C. | 180° C. on fixing | 180° C. except for fixing |
|---|---|---|---|---|
| main driving means 25 | OFF | OFF | ON | OFF |
| low speed driving means 35 | ON | ON | ON | ON |
| magnetic clutch 38 | OFF | ON | OFF | ON |

Table 1 summarizes the operations of the main driving means 25, the low speed driving means 35 and the magnetic clutch 38 corresponding to the surface temperature changes of the fixing roller 3 in the embodiment shown in FIG. 1 to FIG. 4. For the main driving means 25 and the low speed driving means 35, "ON" signifies that they are capable of operation, and "OFF" signifies that they are incapable of operation. For the magnetic clutch 38, "ON" signifies that it is closed, and "OFF" open.

Further operation of the device will be understood from the following. When the power switch of the copying apparatus is closed, the temperature control circuit 43 energizes the heater 5 electrically. The output line l1 is low level while the surface of the fixing roller 3 is heated within a range which lies between room temperature and the predetermined temperature lower than 100° C. Accordingly, the output from an AND gate 45 is low level, a driving circuit 46 cannot energize the magnetic clutch 38, and the magnetic clutch 38 is open. The output line l2 from the temperature control circuit 43 is low level, and thus the output from an AND gate 47 is low level. Therefore, a driving circuit 48 and the main driving means 25 remain inoperable. Consequently the fixing rollers 3 and 4 remain stationary.

When the surface of the fixing roller 3 is heated to a temperature of 100° C. or more, the temperature control circuit 43 applies a high level signal to its output line l1 in response to the output from the temperature detecting element 44. On the contrary, the output line l2 remains at low level, and accordingly the output from AND gate 47 is low level and is reversed by an inverter circuit 49. Therefore, the input signal from a delay circuit 52, which comprises a series resistance 50 and a parallel condenser 51, to AND gate 45 remains at a high level. The output from the AND gate 45 is high level, and accordingly the driving circuit 46 is operated, and the magnetic clutch 38 is energized and is maintained closed. Referring again to FIG. 3, the rotational driving force from the low speed driving means 35 is transmitted from the output shaft 36 via the magnetic clutch 38, the gears 37 and 32, the sprocket wheel 33, the chain 34, the sprocket wheel 21, the rotary shaft 20, the one-way clutch 30, the rotary shaft 15, the sprocket wheel 16 and the chain 17 to the sprocket wheel 14, and the fixing roller 3 is driven to rotate in the direction shown by the arrow (FIG. 2). The rotary speed of the fixing roller 3 with the low speed driving means 35 is lower than a proper speed for fixing.

When the fixing roller 3 is heated to a temperature suitable for fixing by means of further energizing the heater 5 electrically (for instance 180° C. as aforementioned), the temperature control circuit 43 energizes and controls the heater 5 so as to maintain the temperature suitable for fixing. Accordingly the fixing roller 3 is maintained constantly at the temperature 180° C.

When the fixing roller 3 is maintained at the temperature 180° C., the copying operation is performed. Then a print button 53 is pressed. Therefore, a flip-flop 54 is set and a set output thereof of high level is coupled to AND gate 47. The output line l2 from the temperature control circuit 43 is high level when the fixing roller 3 is heated to the temperature 180° C. Therefore, the output from AND gate 47 is high level, the driving circuit 48 is operated, and the main driving means 25 is operated. Driving force of the main driving means 25 is transmitted from the chain 24, via the sprocket wheel 23, the one-way clutch 22, the rotary shaft 20, the one-way clutch 30, the rotary shaft 15, the sprocket wheel 16, the chain 17 and the sprocket wheel 14 to the fixing roller 3, as a result of which the fixing roller 3 is driven to rotate at a relatively high speed suitable for fixing reasonably.

Rotational driving force from the rotary shaft 20 is transmitted from the sprocket wheel 21, via the chain 34 and the sprocket wheel 33 to the gears 32 and 37. Then the magnetic clutch 38 remains open. Referring to FIG. 4, in operation, print button 53 is pressed and the output from the AND gate 47 raises from low level to high level. The output of the leading edge from the AND gate 47 is applied to the inverter circuit 49 and the output from the inverter circuit 49 becomes a trailing edge from high level to low level. The trailing edge corresponds to a forward electric current of a diode 55 which is provided in parallel to the delay circuit 52. Accordingly, the trailing edge and the subsequent signal of low level are applied from the inverter circuit 49 through the diode 55 to the AND gate 45. On the contrary, the low level signal from the inverter circuit 49 is applied to the AND gate 45 independently of operation of the delay circuit 52. The output from the AND gate 45 is at once low level by pressing the print button 53. Therefore, the driving circuit 46 is inoperative and the magnetic clutch 38 is open.

In operation, the copy paper sheet having a toner image is guided between the fixing rollers 3 and 4, heated, fixed and transported out of the copying apparatus. Copy completion signal generating means 56 detects that the copy paper sheet has been fed out from the apparatus housing and corresponds the copy completion signal such as a pulse of high level. Therefore, flip-flop 54 is reset, and consequently the output from the flip-flop 54 to the AND gate 47 is low level. Accordingly, the driving circuit 48 and the main driving means 25 are inoperative. The low level signal from the AND gate 47 is applied to the inverter circuit 49. The inverter circuit 49 which receives the trailing edge from high level to low level corresponding to the AND gate 47 which is produced from the output of the copy completion signal generating means 56 applies the leading edge from low level to high level. This leading edge is applied to the reverse electric current of the diode 55. Accordingly, when a delay time T1 determined by the delay circuit 52 is lapsed after the output from the inverter circuit 49 raises, the high level signal is applied to the AND gate 45 from the delay circuit 52. The output line l1 applied to the input of the AND gate 45 is high level. Accordingly, the output of the AND gate 45 is high level and the magnetic clutch 38 is closed to be energized by the driving circuit 46. The magnetic clutch 38 is closed when the delay time T1 determined by the delay circuit 52 is lapsed after the main driving means 25 stops. Therefore, the rotational driving force from the low speed driving means 35 is transmitted to the fixing roller 3 and causes the fixing roller 3 to rotate at a low speed.

The reason for providing the delay time T1 is described hereinafter. Though the main driving means 25 is not operating, the chain 24 is still passing over the sprocket wheel 23, and the sprocket wheel 23 rotates following the chain 24 inertially. If the magnetic clutch 38 changes from the open state to the closed state as soon as the main driving means 25 is inoperable, a large force of relatively high speed is transmitted to the output shaft 36 which is rotating at a relatively low speed. The direction of the rotational driving force which is transmitted to the output shaft 36 is the same as that of the low speed driving means 35. There should be provided the reducing gear train 40 between the output shaft 36 and the motor 39 in order to rotate the output shaft 36 at a higher speed than that of the motor 39, and the motor 39 should have a relatively large capacity to maintain its rotational driving force. However, if the main driving means 25 is once rendered inoperative and the magnetic clutch 38 is closed, the load tends to increase on the transfer path of a driving force from the main driving means 25 to the motor 39. Therefore, since the magnetic clutch 38 is to be closed when the inertial rotating speed is substantially reduced after the main driving means 25 is rendered inoperative, the delay time T1 prevents a large load from increasing on the transfer path of driving force from the main driving means 25 to the motor 39.

According to another embodiment of the invention, the motor 39 is capable of being inoperable when the magnetic clutch 38 is open.

FIG. 5 is a schematic longitudinal sectional view of another embodiment of the invention similar to FIG. 3. It should be noted that a one-way clutch 57 is provided between the output shaft 36 of the low speed driving means 35 and the gear 37 instead of the magnetic clutch 38. The motor 39 of the low speed driving means 35 is connected instead of the magnetic clutch 38 shown in the electric diagram of FIG. 4, and the output from the inverter circuit 49 is applied to the AND gate 45 directly instead of through the delay circuit 52 and the diode 55. Other constructions of this embodiment are the same as that of the previous embodiment. This operation is summarized in Table 2 which shows that the fixing roller 3 is kept at the temperature 180° C., and the motor 39 is capable of being energized electrically during a copying operation.

TABLE 2

| temperature of fixing roller 3 | room temperature ~ 100° C. | 100 ~ 180° C. | 180° C. on fixing | 180° C. except for fixing |
|---|---|---|---|---|
| main driving means 25 | OFF | OFF | ON | OFF |
| low speed driving means 35 | OFF | ON | OFF | ON |

In accordance with this invention, the main driving means 25 may be operate only during the fixing portion of a copying operation. The reducing gear train 40 may be provided between the magnetic clutch 38 or the one-way clutch 57 and the sprocket wheel 21.

What is claimed is:

1. A variable speed driving device for use in a copying apparatus of the type including a housing, said device comprising:

a casing mounted for movement into and out of the housing;

high speed driving means, mounted on the housing, for generating a high speed driving force;

low speed driving means, separate from said high speed driving means and mounted on the housing, for generating a low speed driving force;

a rotary member having a first rotary shaft rotatably mounted on the housing by a bearing;

a follower member including a second rotary shaft rotatably mounted on said casing for movement therewith between a first inserted position adjacent said rotary member and a second drawn-out position removed from said rotary member;

a magnetic clutch operatively connected to said low speed driving means and having a first mode for transmitting said low speed driving force therefrom and a second mode for interrupting transmission of said low speed driving force;

first power transmitting means for, when said magnetic clutch is in said first mode thereof, transmitting said low speed driving force from said low speed driving means to said rotary member, thereby rotating said rotary member;

first one-way clutch means provided on said first rotary shaft;

second power transmitting means for, upon operation of said high speed driving means, transmitting said high speed driving force from said high speed driving means via said first one-way clutch means to said first rotary shaft, thereby rotating said rotary member;

second one-way clutch means, mounted between said rotary member and said second rotary shaft, for, when said second rotary shaft is in said first position thereof, transmitting rotation of said rotary member to said second rotary shaft; and control means, operatively connected to said high speed driving means and to said magnetic clutch, for, upon said high speed driving means being operative, causing said magnetic clutch to be in said second mode thereof, and for, upon said high speed driving means being rendered inoperative, causing said magnetic clutch to change from said second mode thereof to said first mode thereof only after a delay sufficient to ensure that inertia forces of said high speed driving means acting on said rotary member have been damped.

2. A device as claimed in claim 1, wherein said control means comprises a copy completion signal generating means for generating a signal representative of completion of a copy by the copying apparatus, a flip-flop operable to be reset by said signal from said completion signal generating means, a print button for, upon operation thereof, setting said flip-flop, a delay circuit including a series resistance and a parallel condenser which is charged by said flip-flop via said resistance and which discharges rapidly when said flip-flop is set, and a diode parallel to said resistance, said control means causing said magnetic clutch to change to said first mode when the output from said condenser is at a high level.

3. A device as claimed in claim 1, wherein said follower member further includes a pair of fixing rollers rotatably mounted on said casing and adapted to pass therebetween a copy paper sheet having thereon a toner image, heating means for heating a first of said fixing rollers such that the surface thereof is at a temperature T3 suitable for fixing, and means for transmitting rotation of said second rotary shaft to said first fixing roller, and said control means comprises temperature detecting means for detecting the actual temperature T1 of said surface of said first fixing roller, and means, operable in response to the output of said temperature detecting means and operably connected to said high speed driving means and to said magnetic clutch, for stopping operation of said high speed driving means and causing said magnetic clutch to be in said second mode thereof, thereby stopping rotation of said first fixing roller, when $T1 < T2$, for causing said magnetic clutch to be in said first mode thereof, thereby causing said first fixing roller to rotate at a first speed less than a speed suitable for conducting a fixing operation, when $T2 \leqq T1 < T3$, and for, when $T1 = T3$, causing said magnetic clutch to be in said second mode thereof and operating said high speed driving means, thereby causing said first fixing roller to rotate at a second speed suitable for a fixing operation during a fixing operation, and causing said magnetic clutch to be in said first mode thereof and stopping operation of said high speed driving means, thereby causing said first fixing roller to rotate at said first speed except during a fixing operation, wherein T2 comprises a predetermined temperature less than T3 and higher than the temperature at which the toner begins to soften.

* * * * *